(12) United States Patent
Len (10) Patent No.: US 6,960,909 B2
(45) Date of Patent: Nov. 1, 2005

(54) MEASURING ASSEMBLY

(76) Inventor: Leonard F. Len, 3589 Hendee Rd., Jackson, MI (US) 49201

( * ) Notice: Subject to any disclaimer, the term of this patent is extended or adjusted under 35 U.S.C. 154(b) by 102 days.

(21) Appl. No.: 10/395,909

(22) Filed: Mar. 24, 2003

(65) Prior Publication Data

US 2004/0189286 A1    Sep. 30, 2004

(51) Int. Cl.$^7$ .............................................. G01B 7/14
(52) U.S. Cl. .................. 324/207.24; 324/228
(58) Field of Search .............................. 324/234–235, 324/239–240, 260, 262, 228, 207.23, 207.24

(56) References Cited

U.S. PATENT DOCUMENTS 5,887,499 A  *  3/1999  Roote et al. ................... 82/47

OTHER PUBLICATIONS

Brochure entitled "SR-721SP/726SP Instruction Manual" 1994, 4 pages.

* cited by examiner

*Primary Examiner*—Bot LeDynh
(74) *Attorney, Agent, or Firm*—Harness, Dickey & Pierce, PLC (57) ABSTRACT

A measuring assembly and machining assembly allowing for easy access and maintenance of the measuring assembly. The measuring assembly is disposed within a bushing to allow for easy removal of the measuring assembly. Furthermore, the machining assembly allows for access and maintenance of the measuring assembly with little or no disassembly of the machining assembly. Therefore, increased longevity and reduced maintenance of the measuring assembly is required during operation of the machining assembly.

24 Claims, 7 Drawing Sheets

MEASURING ASSEMBLY

FIELD

The present invention relates generally to precision locating measuring instruments, and particularly to pulse magnetic rods and reader head assemblies for locating a device.

BACKGROUND

For many applications, the determination or knowledge of the location of a first component or tool relative a first member is vital. For example, during machining or cutting of members in various manufacturing processes, it is required that the exact position of the cutting head or tool be known relative to the member being cut or tooled. In that way, the appropriate cuts or tooling can occur on the member being tooled to form the precise tolerances required for the particular member being formed.

For example, on a lathe or cutting machine, a member may be placed relative to a cutting head. The cutting head is then moved relative to the fixed member to cut the member. The position of the cutting head relative the member during the cutting procedure must be known to ensure that the member being cut is cut to the desired size or tolerances. This is particularly important for automated or robotic devices, where the cuts are being made by a pre-programmed system. The system must know the position of the tool relative the member to create the proper cut. Therefore, being able to program or select a desired orientation of a cutting head relative to a member being cut or tooled and being able to determine that the appropriate or selected size or distance has been achieved is required.

One means of determining a location of a cutting head or tool relative to a member is to position the member in a known location and move the cutting head a distance from the known location. Therefore, a rule, scale, or encoder can be used to determine the distance of the cutting head relative the fixed location. Therefore, the distance of the cutting head or the position of the cutting head relative the member positioned at the fixed point is known.

Many members and the machining tools are subjected to relatively harsh environments. Therefore, many of the components and sensors used to determine the position of a cutting head are generally exposed or at least partially exposed to the environment of the cutting or machining booth. Often, the turnings from a lathe or other chips or debris can become lodged in the various components of the automated device and disrupt the operation thereof.

Therefore, it is desirable to provide a system or assembly which can substantially eliminate disruption of the various components that can determine the location of the cutting head or tool head relative to the member being worked upon. Specifically, it is desired to provide mechanisms and assemblies which can protect and substantially enclose the components for determining the position of the tool or cutting head relative to the member being worked.

SUMMARY OF THE INVENTION

A measuring assembly and machining assembly allowing for easy access and maintenance of the measuring assembly. Furthermore, the measuring assembly may be positioned in the tool assembly including portions which allow for easy access and maintenance of the measuring assembly. Generally, the measuring assembly is disposed within a bushing to allow for easy removal of the measuring assembly. Furthermore, the machining assembly allows for access and maintenance of the measuring assembly with little or no disassembly of the machining assembly. Therefore, increased longevity and reduced maintenance of the measuring assembly is required during operation of the machining assembly.

Further areas of applicability of the present invention will become apparent from the detailed description provided hereinafter. It should be understood that the detailed description and specific examples, while indicating the preferred embodiments of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF VARIOUS EMBODIMENTS

The following description of various embodiments is merely exemplary in nature and is in no way intended to limit the invention, its application, or uses. For example, although the following description relates specifically to a two-axis assembly, it will be understood that any appropriate number of axes may be measured. Moreover, the invention may be used in conjunction with any appropriate assembly, such as a lathe, mill, or machine.

Figure 1:
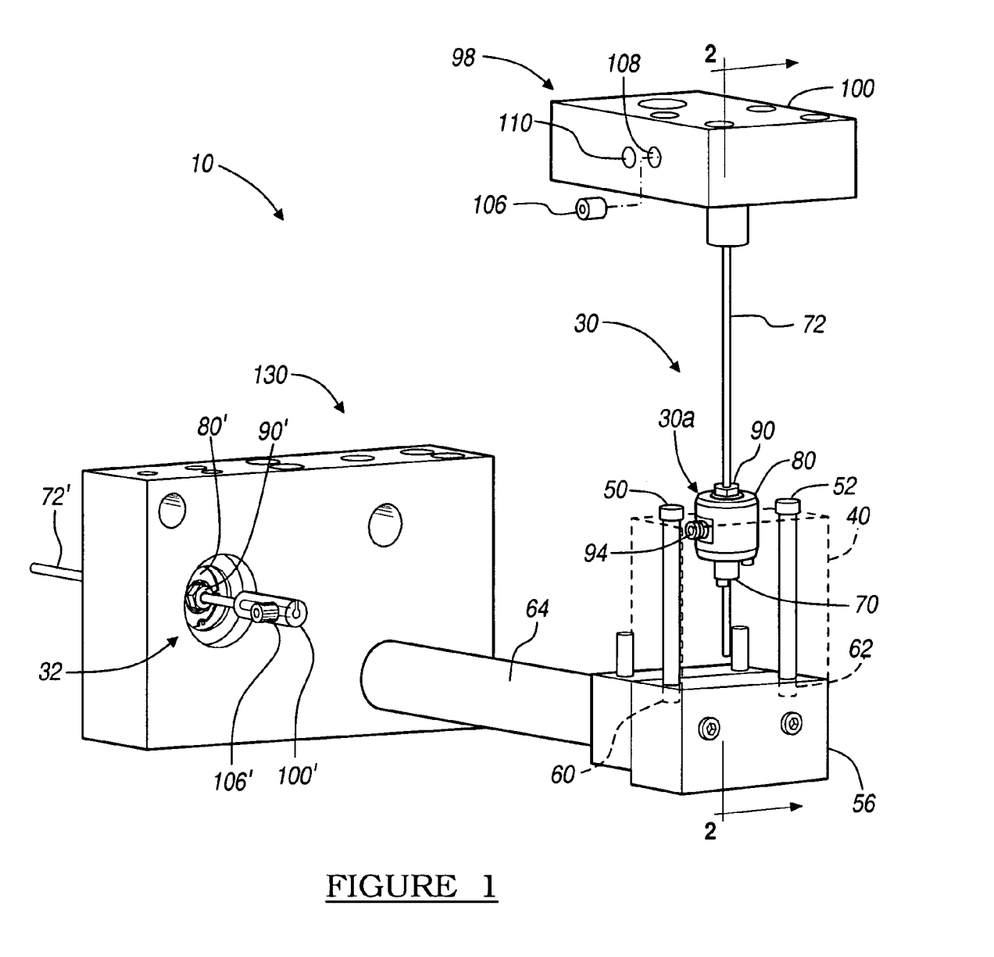
FIG. 1 is a perspective view of a tooling head assembly, with portions removed for clarity, according to an embodiment of the invention.
Figure 2:
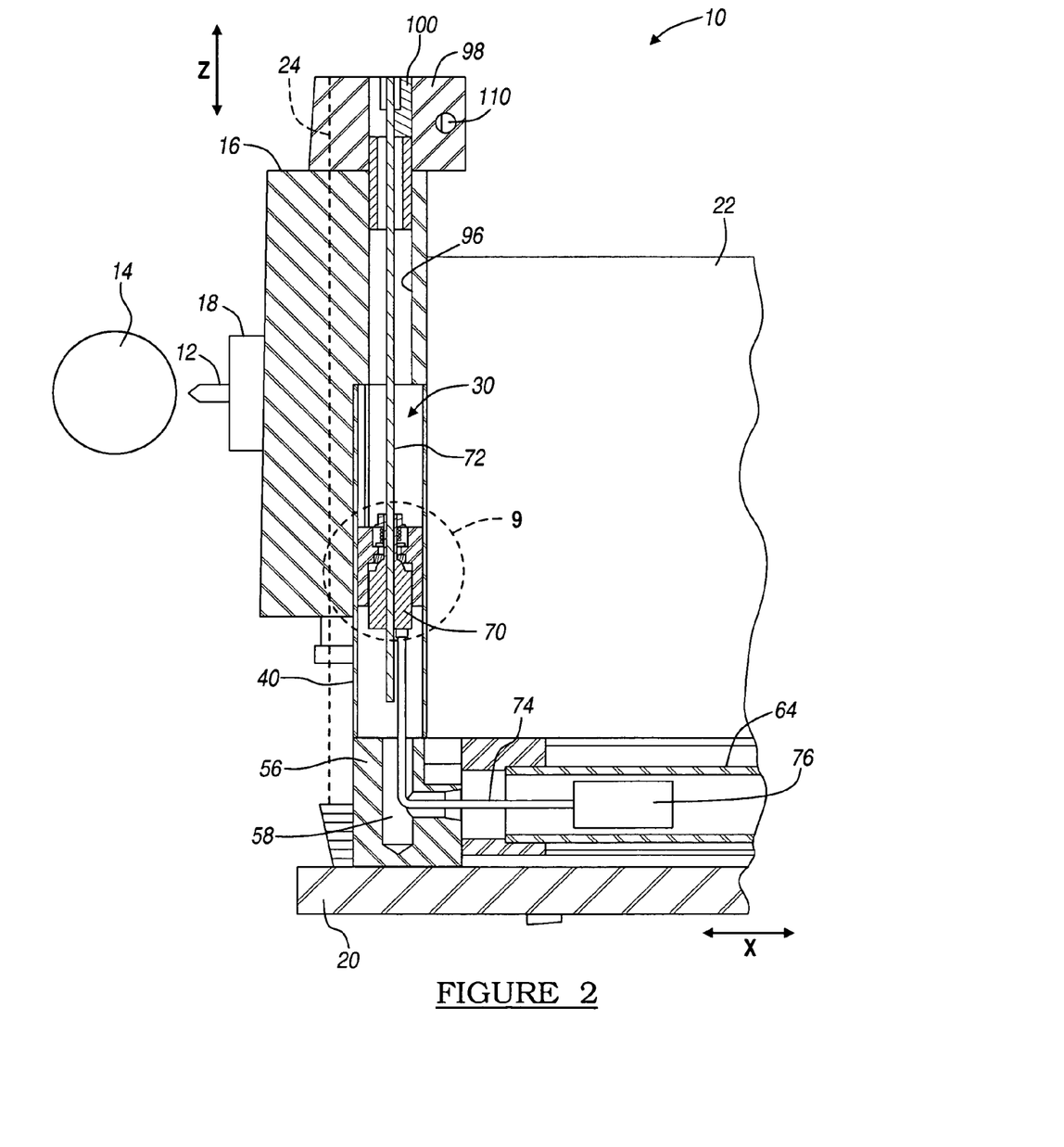
FIG. 2 is a detail cross-sectional view along line 2—2 of FIG. 1, with all portions illustrated.

With reference to FIGS. 1 and 2 a tooling assembly 10 can be used to cut, turn, or perform other appropriate work with a tool 12 to a member or material 14. The tool 12 extends from a tooling or cutting head 16 and may be held with a chuck 18 or other appropriate portion. The machining tool 10 is generally provided to move along a first linear way 20. It will be understand that any appropriate mechanism may be used to allow translation of the assembly 10. The first linear way 20 allows the entire machining assembly 10 to move along a first axis X.

Generally, the machining tool 10 can be positioned at any appropriate orientation or selected position along axis X. Axis X generally allows the machining assembly 10 to move closer to or further from the member 14 to be tooled. It will also be understood that any appropriate number of the linear way 20 may be provided. For example, one linear way 20 may be provided on either side of the assembly 10. Various drive components are provided to move the assembly 10 relative to the linear ways 20 along the axis X. Therefore, the tool assembly 10 can be moved along the axis X relative to the member 14 to provide for positioning of the tool 12 relative to the member 14 at a selected distance.

The tooling head 16 is movable relative to a body 22. The cutting block 16 is also provided with a second linear way 24. It will also be understood that any appropriate number of the second linear ways 24 may be provided to move the cutting block 16 along an axis Z. It will also be understood that any appropriate and generally known drive mechanism can be used to drive the cutting block 16 along the second linear ways 24 along the axis Z.

Therefore, the cutting tool 12 that is affixed to the cutting block 16 can be moved along the X axis by moving the body portion 22 that is operably affixed to the cutting block 16. The tool 12 may also be moved along axis Z by movement of the cutting block 16 along the second linear way 24. In this way, a selected position for the cutting tool 12 can be determined along both the X and Z axes using the assembly 10. Once the selected position of the cutting tool 12 along the X and Z axis is selected, it can be determined using a first measuring assembly 30 and a second measuring assembly 32. Generally the measuring assemblies 30 and 32 can determine relative movement of the assembly 10 and determine absolute, relative, or incremental location of the tool 12 on the X and Z axes.

Figure 3:
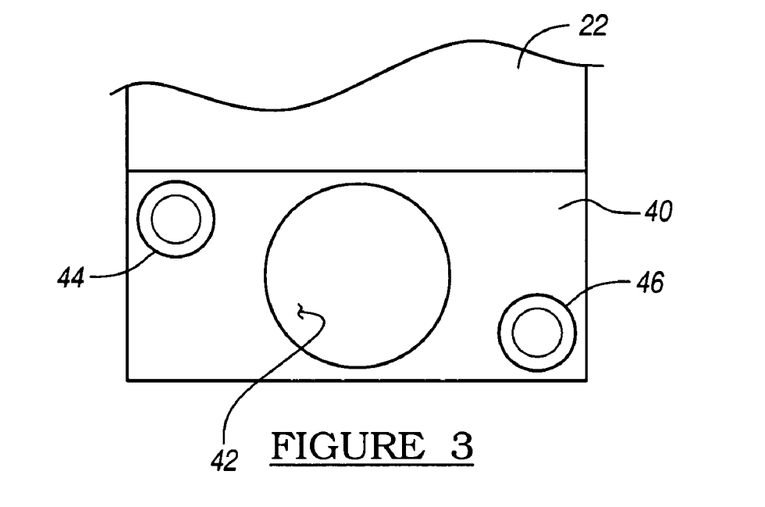
FIG. 3 is a top plan detailed view of a portion of the assembly of FIG. 1.
Figure 4:
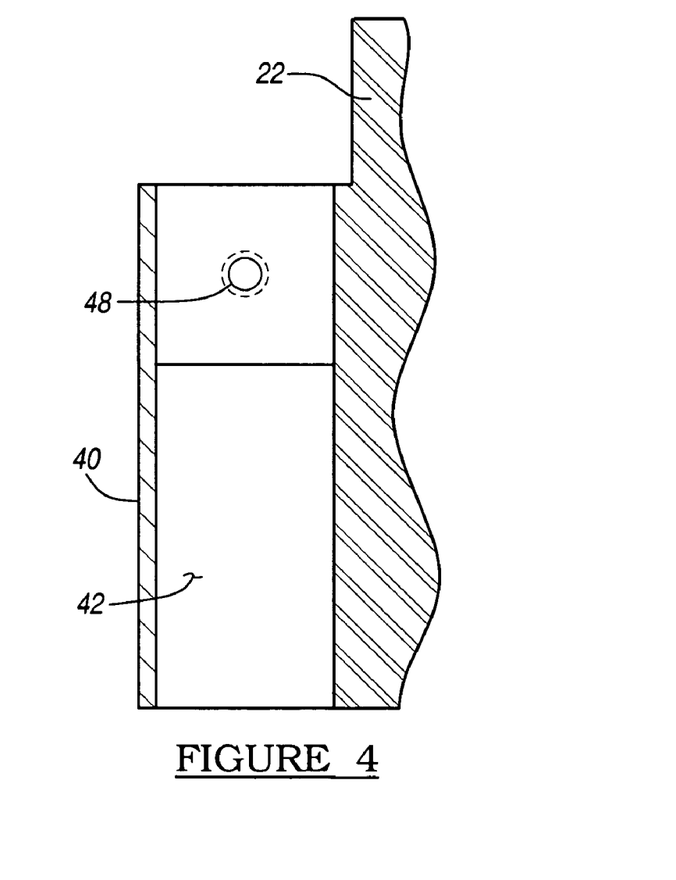
FIG. 4 is a side elevational detailed view of a portion of assembly of FIG. 1.

With continuing reference to FIGS. 1 and 2, and further reference to FIGS. 3 and 4. Extending from the body 22 of the assembly 10 is a measuring assembly portion or block 40. The measuring assembly portion 40 generally includes a first main or measuring assembly bore 42 in addition to a first mounting bore 44 and a second mounting bore 46. In addition, a tapped bore 48 is provided for a set screw 94 (described further herein). Mounting screws 50 and 52 extend through the measuring block portion 40 and engage an access block 56.

The access block 56 includes a first measuring axis bore 58 and two assembly bores 60 and 62. The two assembly bores 60 and 62 are engaged with the fasteners 50 and 52 to hold the access block 56 relative to the measuring assembly block 40. Extending from the access block 56 is a tube or bore 64 which provides a conduit for positioning a wire 74 and other components relative to the measuring assembly portion 40. The tube 64 operably connects to a cable port or bore 66 of the access block 56.

Figure 5:
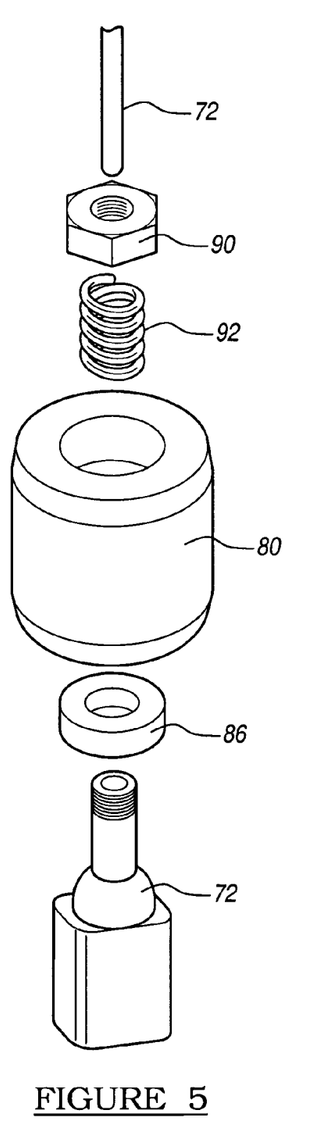
FIG. 5 is an exploded view of a measuring assembly according to an embodiment.

With reference to FIGS. 1, 2, and 5, the first measuring assembly 30 generally includes a reader head 70 and a magnetic pulse rod 72. The reader head 70 and magnetic pulse rod 72 can be obtained from generally known sources such as Sony, Inc. of Japan. The reader head 70 includes a mechanism to read the magnetic pulses formed in and along the magnetic pulse rod 72. As the rod 72 is moved within the reader head 70, a number of pulses can be determined as the rod 72 passes a portion of the head 70. The pulses are a known distance apart thus a measurement or movement of the rod 72 relative to the reader head 70 can be determined.

Figure 6:
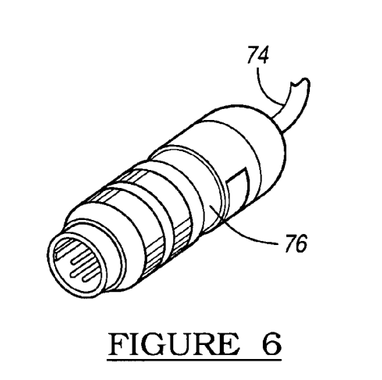
FIG. 6 is a perspective view of a connector for the measuring assembly.
Figure 7A:
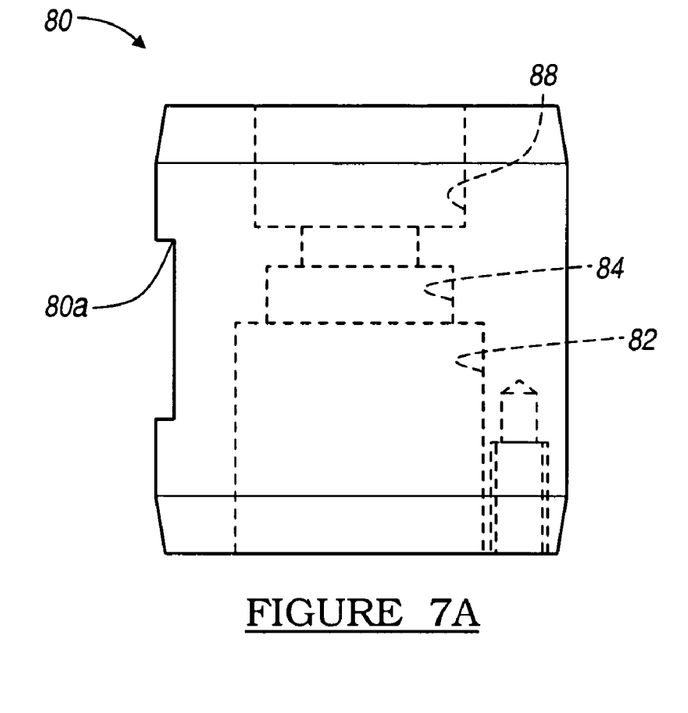
FIG. 7A is a side elevational view of a bushing according to an embodiment.
Figure 7B:
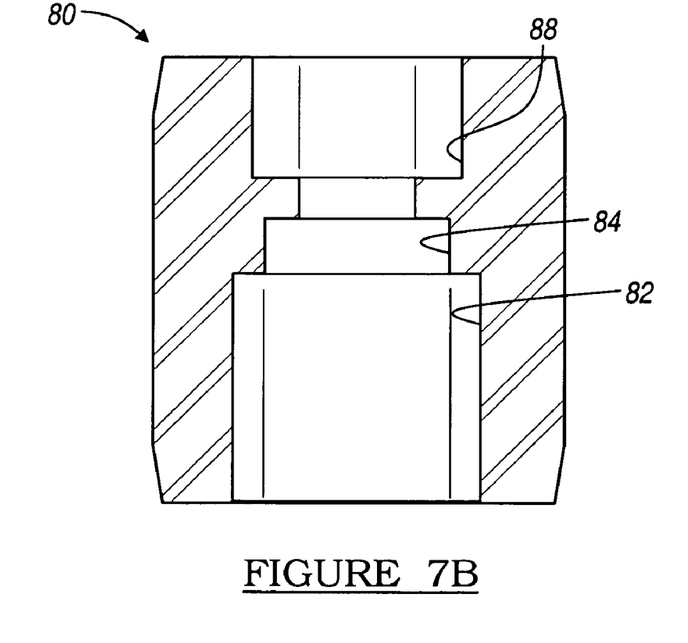
FIG. 7B is a cross-sectional view of the bushing of FIG. 7A.

A portion of electronics or wiring 74 extends from the reader head can interconnect with a connector 76 (FIG. 6) which provides an easy plug or connection to various external components. The connector 76 is able to extend through the conduit 64 to provide for easy access and movement of the connector 76 relative to the assembly 10.

With reference to FIGS. 1, 5, 7A–7B, and 8, the measuring assembly 30 further includes a bushing 80 into which the reader head 70 is at least partially received or positioned. The bushing 80 both holds and encases the reader head 70. Therefore, the bushing 80 may be any appropriate element or have any appropriate geometry depending upon the assembly 10 to which it is applied. Moreover, the bushing 80 may be any housing or shell that allows for simple and efficient assembly and disassembly of the measuring device 30. Therefore, reference to the bushing 80 will be understood to be exemplary only.

The reader head 70 is positioned with or disposed within the bushing 80 to be placed within the measuring assembly block 40. The bushing 80 includes an internal bore including a plurality of shoulders or steps. A first bore portion 82 substantially receives a first portion of the reader head 70. A second annular or bore portion 84 receives or allows disposing of a bearing 86 therein. The reader head 70 may then engage or be disposed relative to the bearing 86. A third shoulder or bore portion 88 allows for fixing of the reader head 70 within the bushing 80 by use of any appropriate fastening means. For example, a nut 90 or other fastener can be engaged to the reader head 72 to hold the reader head 72 relative the bushing 80. Also, a spring 92 may be used to assist in aligning the reader head 72 of the first measuring assembly 30.

Figure 8:
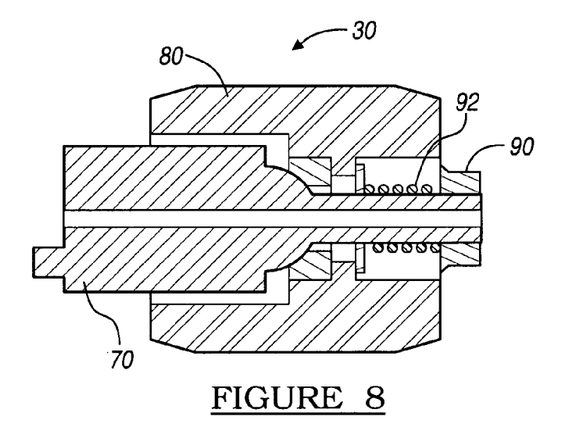
FIG. 8 is an assembled view of a measuring assembly according to an embodiment.

This portion of the measuring assembly 30, generally including the bushing 80 and the reader head 70 positioned therein, is disposed within the measuring assembly block 40 extending from the body 22. Generally, the first portion of 30a of the measuring assembly 30 is positioned in the measuring block 40 and a set screw 94 is positioned through a set screw bore 48 to engage the bushing 80 in a set screw portion 80a. The set screw 94 will be understood to be exemplary. Any appropriate device or mechanism may be used to hold the bushing 80 in the selected position. After the set screw 94 is used to lock the bushing 80 in a selected position, the access block 56 can be mounted to the measuring assembly block 40.

The cutting block 16 includes a measuring assembly bore 96 through which the rod 72 may extend. The rod 72 is mounted relative to the cutting block 16. For example, the rod may be fixed relative to the cutting block 16 itself or fixed to a bar or auxiliary block 98 which is fixed relative the cutting block 16. The rod 72 is held relative to the auxiliary block 98 with a bushing 100. The bushing 100 is a split bushing (FIG. 9) such that it may be collapsed or pressed relative to the rod 72 to hold the rod 72 tightly therein.

Figure 9:
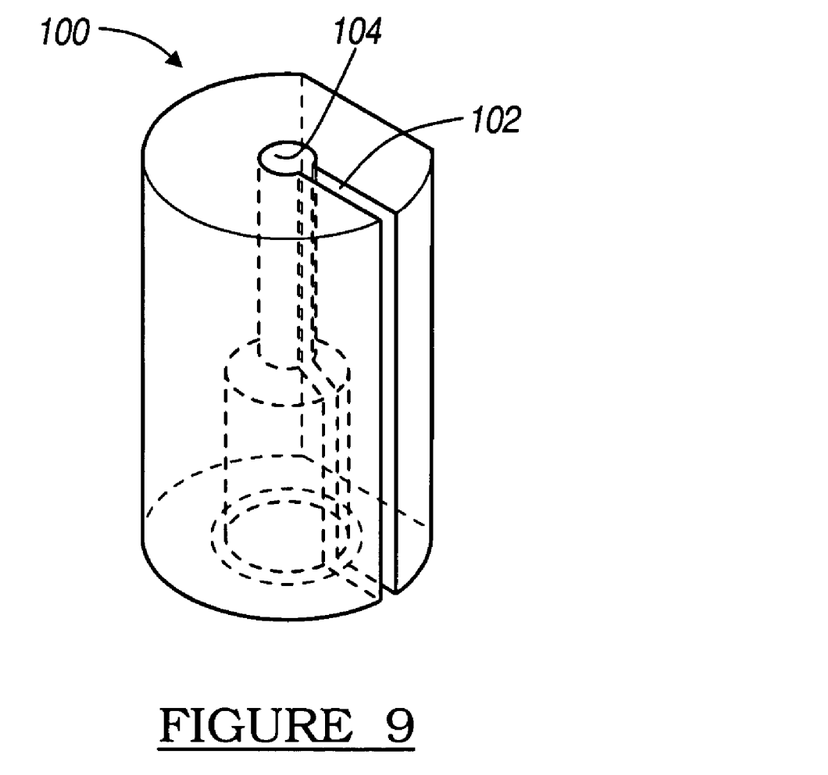
FIG. 9 is a perspective view of a split bushing according to an embodiment.

The bushing 100 includes a split 102 extending from a perimeter to a rod bore 104. A set screw side is able to be compressed with a set screw 106 provided through a set screw bore 108 formed in the auxiliary block 98. It will be understood that any other appropriate means may be used to fix the rod 72 relative the block 98 or to the cutting block 16.

Generally, the rod 72 moves with the cutting block 16 such that movement of the cutting block 16 can be determined with the movement of the rod 72 relative the reader head 70. Nevertheless, providing the bushing 100 with the set screw 106 provides for an efficient way to access the rod 72 without disassembling the entire assembly 10. With the split bushing, the set screw 106 is loosened and the bushing 100 is able to expand and release the rod 72.

An oil bore 110 may also be provided in the block 98 or in the cutting head 16, if the rod 72 is fixed thereto. The oil bore 110 allows for a mist of oil to be sprayed onto the rod 72 during operation of the measuring assembly 30. Therefore, the rod 72 remains substantially lubricated during operation and allows for ease of movement of the rod 72 through the reader head 70. The oil bore 110 may be positioned at any appropriate position to allow for an oil mist to be provided onto the rod 72 during operation of the measuring assembly 30.

With the bushing 80 fixed in the measuring assembly block 40 extending from the body 22 and the rod 72 fixed relative the cutting head 16, either directly or through the member 98, the movement of a cutting head 16 along the axis Z can be determined. Specifically, as the cutting head 16 moves along the axis Z, the movement of the rod 72 is determined using the reader head 70. Movement of the cutting head 16 is essentially movement of the cutting tool 12 because the cutting tool 12 is fixed relative to the cutting head 16.

Furthermore, the access block 56 provides efficient access to the first measuring assembly 30 through the measuring assembly block 40. Removing the fasteners 50 and 52 allows for displacement of the access block 56 such that access to the first measuring assembly 30 is allowed. Loosening or removing of the first set screw 94 such that the bushing 80 is freed and the second set screw 106 such that the split bushing 100 is freed allows for removal of the first measuring assembly 30 from the tooling assembly 10. This allows for efficient cleaning or replacement of the first measuring assembly 30 without complete disruption of the tooling assembly 10. Rather, only the access block 56 is removed and the various set screws 94 and 106 can be loosened to remove the various bushings 80 and 100.

Moreover, because the machine assembly 10 is generally provided in an opened or exposed atmosphere or working conditions, the access block 56 and the first bushing 80 substantially seal or contain the first measuring assembly 30 from external environmental impacts. Therefore chips, turnings, or other contaminants, are kept removed from the first measuring assembly 30. Therefore, the first measuring assembly 30 is left to work smoothly and cleanly during an extended period of time. Nevertheless, if the first measuring assembly 30 does become fouled, the access block 56 in conjunction with the various bushings 80 and 100, can be used to allow for easy removal and cleaning the first measuring assembly 30.

With reference to FIGS. 1 and 10A–10C, the machine assembly 10 includes a rear block or member 130. The rear block 130 is operably connected to the main body 22 through second measuring assembly 32. That is, the main body 22 is able to move relative to the rear block 130. The second measuring assembly 32, however, interconnects the rear block 130 and the main body 22 such that movement of the main body 22 relative the rear block 130 is known. The main body 22 is able to move along the axis X with the cutting block 16 affixed thereto. Therefore, movement of the main body 22 along the axis X allows the tool 12 to be moved along the axis X.

Figure 10A:
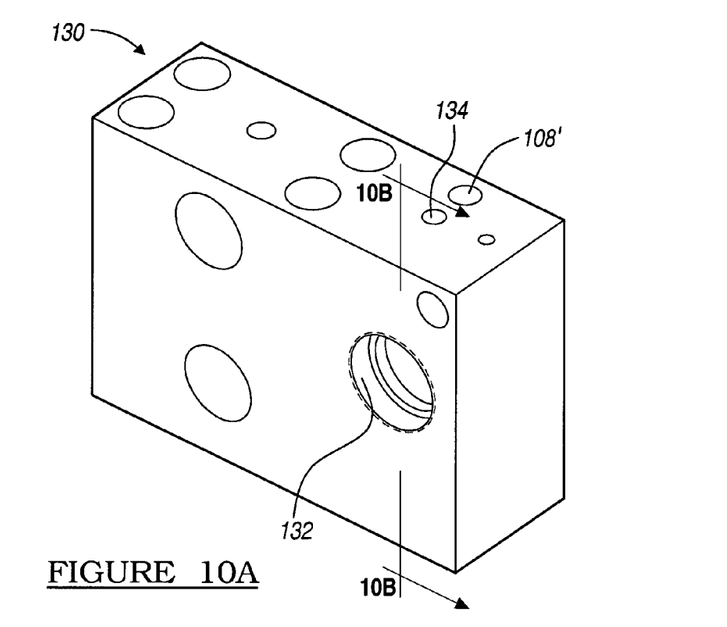
FIG. 10A is a perspective view of a the rear plate of the assembly of FIG. 1.
Figure 10B:
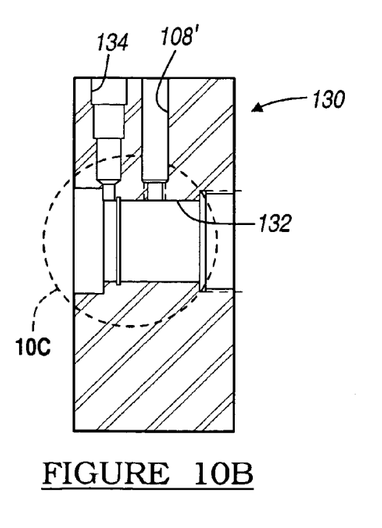
FIG. 10B is a cross-sectional view of a portion of FIG. 10A.
Figure 10C:
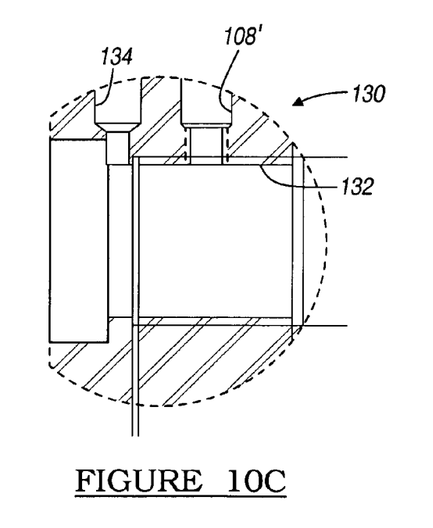
FIG. 10C is a detailed view of a portion of FIG. 10B.

The rear block 130 includes a measuring assembly bore 132. The second measuring assembly 32 is at least partially disposed in the measuring assembly bore 132. The second measuring assembly 32 is substantially similar to the first measuring assembly 30, therefore like parts will be referenced with similar reference numerals augmented with a prime (').

A split bushing 100' is positioned within the main body 22. A set screw 106' is provided through a set screw bore (not particularly shown) so that the set screw 106' can lock the split bushing 100' around the pulse rod 72'. A reader head 70' is disposed within the first bushing 80' within the measuring assembly bore 132. The reader head 72' is held in place with the nut 90' such that the rod 72' can move relative to the reader head 70' as the main body 22 moves relative the rear block 130.

As discussed above, as the main body 22 moves the rod 72', fixed therein with the split bushing 100' and set screw 106', allows movement of the rod 72' relative to the reader head 70'. Moreover, this known movement is used to determine the location of the tool 12 relative to the X axis. As the pulse rod moves relative the reader head 70', the number of pulses can be counted in a distance determined therefrom. Generally, the second measuring assembly 32 can be substantially similar or identical to the first measuring assembly 30 and provided from the same source.

The rear block 130 also provides an oil bore 134. The oil bore 134 is connected to an oil source and allows a misting of oil applied to the measuring assembly bore 132. Therefore, oil can be misted onto the second measuring assembly 32 during operation of the machining assembly 10. Therefore, the second measuring assembly 32 may be maintained and lubricated for ease of operation and reduced maintenance.

Furthermore, the bushing 82' allows for the second measuring assembly 32 to be substantially isolated from an exterior environment. As discussed above, the machining assembly 10 may be used in a substantially harsh environment. Therefore, the bushing 80' substantially covers the reader head 70' from any material debris produced by the cutting tool 12 or other contaminants. Therefore, the maintenance of the second measuring assembly 32 can be reduced and the longevity of the second measuring assembly 32 increased. Moreover, if such maintenance or replacement of the measuring assembly 32 is required, removing the set screw from the set screw bore that holds the bushing 80 and the set screw 106' from the set screw bore 108' allows for easy removal of the second measuring assembly 32 from the machining assembly 10.

Therefore, providing the various bushings 80, 80' and 100, 100' substantially eliminates or reduces labor to obtain access to the first and second measuring assemblies 30 and 32. Moreover, the various bushings 80, 80' and 100, 100' reduce the amount of material which can access or foul the first and second measuring assemblies 30 and 32 to substantially limit or lessen maintenance required of the measuring assemblies 30 and 32. Moreover, the various blocks through which the measuring assemblies 30 and 32 are provided, for example the rear block 130 and the auxiliary block 98 include ports that allow for an oil mist to be sprayed onto the first and second measuring assemblies 30 and 32. Therefore, maintenance of the measuring assemblies 30 and 32 is again reduced because of the increased lubrication which may be maintained constantly during operation of the measuring assemblies 30 and 32. Moreover, the oil mist ports 110 and 134 allow for further reduced maintenance of the measuring assemblies 30 and 32 because the oil can be provided to the first and second measuring assemblies 30 and 32 during operation of the machining assembly 10 without disassembling the machining assembly 10.

It will be understood that the measuring assemblies 30 and 32 may be any appropriate measuring assembly. The magnetic pulse rod 72 and 72' is merely exemplary. Any assembly or system able to determine movement of a first component relative to a second component may be used. For example the reader head may include an optical reader and the rod an optically readable marking. Thus reading the optically readable markings would provide the motion information.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An assembly for moving a tool, comprising:
    a first component fixed relative to a first axis;
    a second component translatable relative to said first component and along said first axis; and
    a measuring assembly operably disposed between said first component and said second component to determine a movement of said second component along said first axis, including:
        an elongated member including an indicia formed therein:
        a system disposed in a first bushing for detecting said indicia to determine a distance moved by said elongated member; and
        a second bushing to substantially fix said elongated member relative to said first component.

2. An assembly for determining motion of a member along an axis, comprising:
    an elongated member including indicia formed thereon;
    a reader head for detecting said indicia as said elongated member moves relative to said reader head;
    a first bushing to hold said reader head and allow translation of said elongated member relative to said reader head; and
    a second bushing to selectively engage a portion of said elongated member.

3. An assembly for accessing and manipulating a measuring apparatus, comprising:
    a first component fixed relative to a first axis;
    a tooling component translatable relative to said first component and along said first axis; and
    a measuring assembly to determine a movement of said tooling component along said first axis, including:
        a movable member including a portion generally fixed relative to said tooling component;
        a casing substantially fixed relative to said first component; and
        a reader head disposed and at least partially enclosed by said casing;
        wherein said reader head is able to detect movement of said movable member to determine a distance moved by said moveable member.

4. The assembly of claim 1, wherein said elongated member is substantially parallel with said first axis such that movement of said first component along said first axis is at least one of directly proportional and equivalent to movement of at least one of the movement of the elongated member and the movement of said first component relative to said elongated member.

5. The assembly of claim 1, wherein said indicia is selected from a group including an optically readable indicia, a magnetically readable indicia, and combinations thereof.

6. The assembly of claim 1, wherein said second bushing is selectable between a substantially constricted position and an unconstricted position wherein said constricted position substantially holds said elongated member and said unconstricted position releases said elongated member.

7. The assembly of claim 6, further comprising:
    a locking member that operably moves said second bushing between said unconstricted position and said constricted position such that said second bushing is able to selectively hold and selectively release said elongated member.

8. The assembly of claim 1, further comprising:
    a locking member to operably engage said first bushing to substantially hold said first bushing in a selected position;
    wherein said locking member may be removed to substantially remove said first bushing and said system substantially as a single unit.

9. The assembly of claim 1, wherein a first locking member is operable relative to said second bushing to substantially hold said second bushing and said elongated member as a single unit for use or removal; and
    a second locking member to substantially hold said first bushing and said system as a single unit for use or removal thereof;
    wherein said first locking member and said second locking member can be removed to remove said first bushing, said elongated member, said second bushing, and said system generally at once while substantially leaving said first component and said second component in an operating position.

10. The assembly of claim 1, further comprising:
    a second measuring assembly including:
        a second elongated member orientated along a second axis;
        a third bushing having disposed therein a second system for measuring an indicia formed on said second elongated member; and
        a fourth bushing for substantially holding said second elongated member translatable relative to said second system.

11. The assembly of claim 10, further comprising:
    a third locking member operable to lock said third bushing and said second system; and
    a fourth locking member operable to lock said fourth bushing relative to said second elongated member;
    wherein said third locking member and said fourth locking member can be removed to remove said third bushing, said system, said fourth bushing and said second elongated member substantially as a unit.

12. The assembly of claim 2, wherein said second bushing selectively engages an elongated member to hold said elongated member at a selected axis that is substantially aligned with said reader head.

13. The assembly of claim 2, further comprising:
    a first locking member to substantially lock said first bushing relative to said reader head.

14. The assembly of claim 13, wherein said first locking member selectively locks said first bushing relative to a component and allows for selective removal of said first bushing and said reader head from said component while substantially unaffecting said first component.

15. The assembly of claim 2, further comprising:
    a second locking member to operably engage said second bushing;
    wherein said second locking member substantially locks said second bushing relative to said elongated member to hold said elongated member in a selected position relative to a first component.

16. The assembly of claim 15, wherein said elongated member is both lockable relative said first component and movable relative said reader head.

17. The assembly of claim 15, wherein said second locking member is operable to allow for selective removal of said second bushing and said elongated member from said component while substantially unaffecting said component.

18. The assembly of claim 3, further comprising:
a first locking member to substantially move said casing between a locked position and an unlocked position;
wherein when said first locking member is in said unlocked position said casing and said reader head are removable from said assembly as a unit while generally unaffecting said assembly.

19. The assembly of claim 3, further comprising:
a bushing generally movable between a locked position and an unlocked position; and
a second locking member to operably engage said bushing to move said bushing between said locked position and said unlocked position;
wherein in said locked position said bushing substantially holds said movable member.

20. The assembly of claim 19, wherein said bushing is operably interconnected with said tooling component such that movement of said tooling component moves said movable member.

21. The assembly of claim 20, wherein when said locking member moves said bushing to said unlocked position said bushing and said movable member may be removed from the assembly without substantially altering the assembly.

22. The assembly of claim 3, further comprising:
a second locking member wherein said second locking member is operable to selectively fix and selectively release said casing;
wherein when said locking member selectively releases said casing said casing and said reader head may be removed from said first component without substantially altering the assembly.

23. The assembly of claim 21, further comprising a second casing movable between a fixed and a released position such that in said released position said casing may be removed from the assembly without substantially altering the assembly.

24. The assembly of claim 3, further comprising:
a second movable member generally movable along a second axis;
a second bushing operable between a fixed position and an unfixed position; and
a second locking member to operably select said bushing in either of said fixed position or said unfixed position;
wherein said second locking member can select said second bushing to said unlocked position to remove said bushing and said second movable member as a unit without substantially altering the assembly.

* * * * *